(12) United States Patent  
Park et al.

(10) Patent No.: US 9,107,179 B2
(45) Date of Patent: Aug. 11, 2015

(54) POSITION UPDATING METHOD AND DEVICE FOR M2M COMMUNICATION

(75) Inventors: Gi Won Park, Anyang-si (KR); Young Soo Yuk, Anyang-si (KR); Jeong Ki Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 111 days.

(21) Appl. No.: 13/991,116

(22) PCT Filed: Dec. 1, 2011

(86) PCT No.: PCT/KR2011/009279
§ 371 (c)(1),
(2), (4) Date: May 31, 2013

(87) PCT Pub. No.: WO2012/074317
PCT Pub. Date: Jun. 7, 2012

(65) Prior Publication Data
US 2013/0244695 A1    Sep. 19, 2013

Related U.S. Application Data

(60) Provisional application No. 61/418,817, filed on Dec. 1, 2010.

(51) Int. Cl.
*H04W 24/00* (2009.01)
*H04W 64/00* (2009.01)
*H04W 4/00* (2009.01)
*H04W 60/00* (2009.01)
*H04W 8/02* (2009.01)

(52) U.S. Cl.
CPC .............. *H04W 64/00* (2013.01); *H04W 4/005* (2013.01); *H04W 60/00* (2013.01); *H04W 8/02* (2013.01)

(58) Field of Classification Search
CPC .......................... H04W 64/00; H04W 64/003
USPC ............. 455/456.1–456.6, 432.1–432.3, 433, 455/434, 435.1–435.3, 458
See application file for complete search history.

(56) References Cited

U.S. PATENT DOCUMENTS

| | | | |
|---|---|---|---|
| 2005/0119008 A1 | 6/2005 | Haumont | |
| 2007/0218926 A1* | 9/2007 | Zhuang et al. | 455/466 |
| 2009/0023453 A1* | 1/2009 | Hu et al. | 455/452.1 |
| 2010/0034128 A1* | 2/2010 | Yim et al. | 370/312 |
| 2010/0035633 A1* | 2/2010 | Park et al. | 455/456.1 |
| 2010/0057485 A1 | 3/2010 | Luft | |
| 2010/0062772 A1* | 3/2010 | Peng et al. | 455/436 |
| 2010/0081451 A1* | 4/2010 | Mueck et al. | 455/456.1 |
| 2010/0167756 A1* | 7/2010 | Park et al. | 455/456.1 |
| 2011/0201344 A1* | 8/2011 | Ryu et al. | 455/450 |
| 2013/0100895 A1* | 4/2013 | Aghili et al. | 370/329 |

OTHER PUBLICATIONS

3GPP TS22.368 V10.2.0 "Service requirements for Machine-Type Communications (MTC)" Stage I(Release 10) Oct. 1, 2010 See p. 12, section 7.2.1 and p. 14, section 7.2.6.

* cited by examiner

*Primary Examiner* — Rafael Pérez-Gutiérrez
*Assistant Examiner* — Mark G. Pannell
(74) *Attorney, Agent, or Firm* — McKenna Long & Aldridge LLP

(57) ABSTRACT

Provided are a position updating method and device for Machine To Machine (M2M) communication. An M2M device transmits a position update capability message including a mobility type and an M2M traffic type to a base station, and receives a position update capability confirmation message including a position update type from the base station. The MTC device performs a position update according to the position update type.

11 Claims, 4 Drawing Sheets

POSITION UPDATING METHOD AND DEVICE FOR M2M COMMUNICATION

This Application is a 35 U.S.C. §371 National Stage Entry of International Application No. PCT/KR2011/009279, filed Jan. 12, 2011 and claims the benefit of U.S. Provisional Application No. 61/418,817, filed Dec. 1, 2010, all of which are incorporated by reference in their entirety herein.

BACKGROUND OF THE INVENTION

1. Field of the invention

The present invention concerns wireless communications, and more specifically, to a method and apparatus for performing a location update for Machine To Machine (M2M) communication in a wireless communication system.

2. Related Art

A Machine To Machine (M2M) communication is a type of data communication including one or more entities that do not require human interaction. That is, the M2M communication is directed toward the concept that rather than human beings performing communication using a terminal, a machine performs communication using an existing wireless communication network. The machine used for the M2M communication is referred to as an M2M device, and various types of M2M devices are present which are used, for example, in a bending machine or for measuring the water level in a dam.

Since the M2M device has different characteristics from those of general terminals, a service optimized for the M2M communication may differ from a service optimized for human-to-human communication. The M2M communication, as compared with current mobile network communication services, may feature, e.g., a different market scenario, data communication, less expenses and efforts, potentially a number of M2M devices, a broad service area, and low traffic per M2M device.

The conventional location update is used for grasping the location of a terminal in a paging group. However, an M2M device may have very high or low mobility.

There is a need for a location updating scheme considering the features of M2M communication.

SUMMARY OF THE INVENTION

The present invention provides a method and apparatus for performing a location update for Machine To Machine (M2M) communication.

Technical Solution

In an aspect, a method of performing a location update for Machine To Machine (M2M) communication includes transmitting a location update capability message to a base station, the location update capability message including a mobility type of an M2M device and an M2M traffic type, receiving a location update capability confirm message from the base station, the location update capability confirm message including a location update type, and performing location update according to the location update type.

Thee location update type may include periodic location update or a location-based location update.

The location-based location update may be performed on a per-cell or per-paging group basis.

The location update capability message and the location update capability confirm message may be exchanged while the MTC device enters into a network or re-enters into the network.

The location update may be performed by the MTC device in an idle mode.

In another aspect, a wireless device configured for performing a location update for Machine To Machine (M2M) communication includes a radio frequency (RF) unit configured to transmit and receive a radio signal, and a processor operatively connected to the RF unit. The processor is configured to transmit a location update capability message to a base station, the location update capability message including a mobility type of an M2M device and an M2M traffic type, receive a location update capability confirm message from the base station, the location update capability confirm message including a location update type, and perform location update according to the location update type.

There is suggested a location update considering mobility and traffic characteristics specific to M2M communication. Signaling overhead due to the location update may be reduced, and power of the M2M device may be saved.

DESCRIPTION OF EXEMPLARY EMBODIMENT

Figure 1:
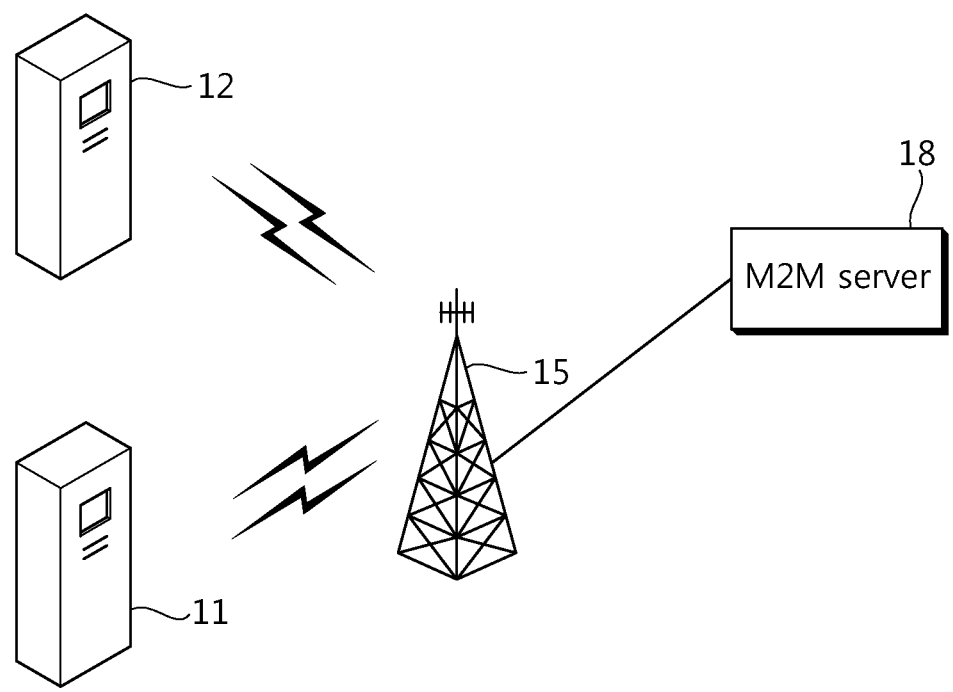
FIG. 1 shows an example of M2M (Machine to Machine) communication.

FIG. 1 shows an example of M2M (Machine to Machine) communication.

The M2M communication refers to exchanging information between M2M devices 11 and 12 through a base station (BS) 15 or exchanging information between the M2M device 11 and an M2M server 18 through the base station without relying on human interaction.

The M2M server 18 is an entity that communicates with the M2M device 11. The M2M server 18 executes an M2M application and provides an M2M-specific service to the M2M device 11.

The M2M device 11 is a wireless device that provides M2M communication and may be stationary or mobile.

A service provided through the M2M communication may differ from a service provided by the existing communication that involves a human being, and there are various categories of services, such as tracking, metering, payment, medical services, or remote control.

What follows is representative examples of M2M features in light of requirements for an individual service:

1) time controlled feature: this means that the M2M device transmits or receives data only within a predefined specific period. Accordingly, unnecessary signaling that may occur outside the predefined specific period may be prevented.

2) time tolerant feature: this means the M2M device may delay data transfer. A network operator, in case network load is larger than a predetermined threshold of load, restricts access of the M2M device to a network or transmission of data to another MTC device and may dynamically restrict the amount of data that may be transferred by the MTC device in a specific area.

3) offline indication feature: this means that, in case no more signaling is possible between the M2M device and the network, notifying this to the M2M device at a proper time is requested.

4) PAM (Priority Alarm Message) feature: this means that when the M2M device is subjected to an emergency that requires an imminent caution, such as when it is robbed or vandalized, the network is first alerted.

It is considered that a few hundreds to a few thousands of M2M devices are arranged in one cell (or base station). Accordingly, the M2M devices are difficult to identify with the existing terminal identifiers, and thus, the following identifiers are considered:

STID (Station Identifier): an identifier for identifying an M2M device in the domain of a base station. The base station may allocate the same STID to a plurality of M2M devices.

MGID (M2M Group Identifier): an identifier used to uniquely identify an M2M device group in the domain of a network entity that allocates an MGID.

FMDID (Fixed M2M Deregistration Identifier): an identifier used to uniquely identify an M2M device in the domain of a base station. The FMDID is allocated to an M2M device in an idle mode and is released when the M2M device enters into the network.

Location update is now described.

In general, location update may be conducted on a per-paging group basis in an idle mode. A mobile station may belong to one or more paging groups. A paging controller (PC) of each paging group, if there is a call or data transmitted from an external network to the mobile station, performs paging. The paging controller transfers a paging message to all the base stations in the paging group, and each base station broadcasts a paging advertisement message to the mobile station.

Referring to section 16.2.18.4 of IEEE (Institute of Electrical and Electronics Engineers) P802.16m/D10 "Part 16: Air Interface for Broadband Wireless Access Systems: Advanced Air Interface", published on Nov. 24, 2010, a location update in an IEEE 802.16-based system is disclosed. However, the wireless communication system to which the present invention is applicable is not limited to the IEEE 802.16-based system and may also be applicable to various wireless communication systems including 3GPP (3rd Generation Partnership Project) or LTE (long term evolution) systems.

Figure 2:
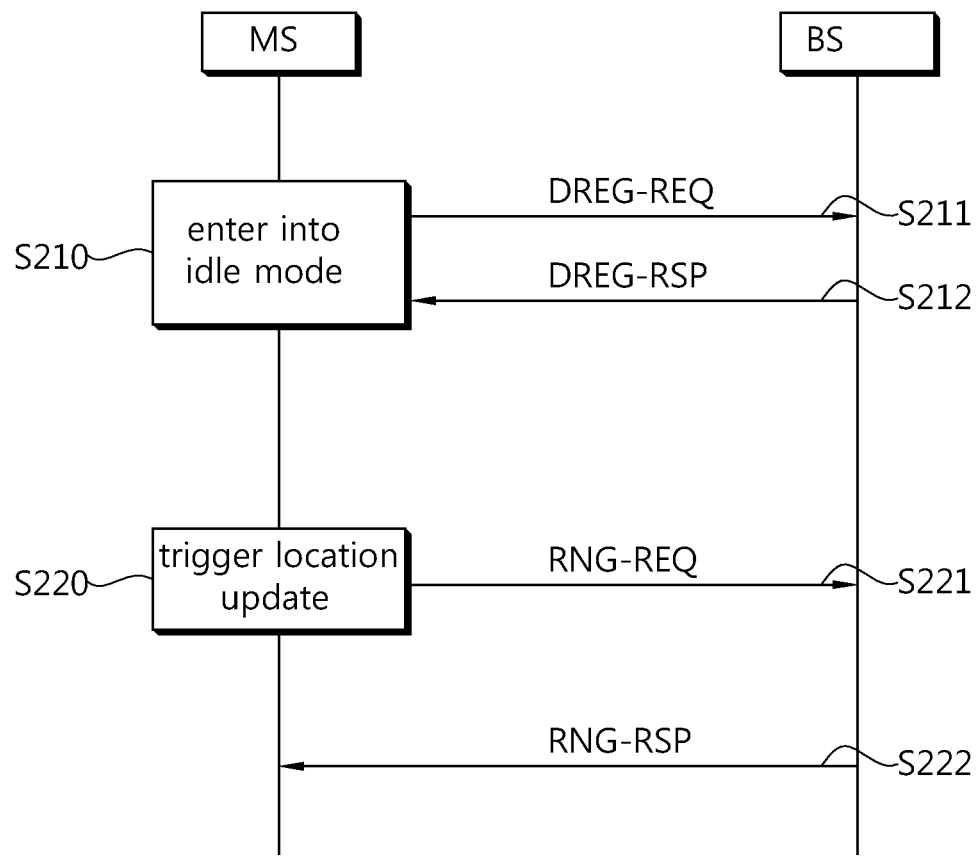
FIG. 2 is a flowchart illustrating IEEE P802.16m/D10-based location update.

FIG. 2 is a flowchart illustrating IEEE P802.16m/D10-based location update.

In step S210, the mobile station (MS) enters into an idle mode. The entry into the idle mode is performed by exchanging a DREG-REG (Deregistration-Request) message and a DREG-RSP (Deregistration-Response) message between the mobile station and a base station (BS).

In step S220, the mobile station, in the idle mode, determines whether conditions for location update triggering are met (S220).

In step S221, if the conditions of location update triggering are met, the mobile station sends a RNG-REQ (Ranging-Request) message to the base station. In step S222, the base station sends a RNG-RSP (Ranging-Response) message to the mobile station.

The conditions of the location update triggering are as follows:

(1) if it is detected that the current base station does not support the currently allocated paging group, the mobile station performs location update. The mobile station may detect whether to support by monitoring a paging group ID transmitted from the base station.

(2) the mobile station periodically performs location update if the idle mode timer expires. When the location update is performed, the idle mode timer starts/restarts.

(3) the mobile station performs location update as part of a typical power down process.

The above-described location update may not be appropriate to the M2M communication. For example, since an M2M device installed at a fixed location has little mobility, a paging group that has been registered once is not highly likely to be changed. Accordingly, periodic location update only contributes to exchange of unnecessary messages, and further, such location update may lead to an increase in power consumption of the M2M device.

Figure 3:
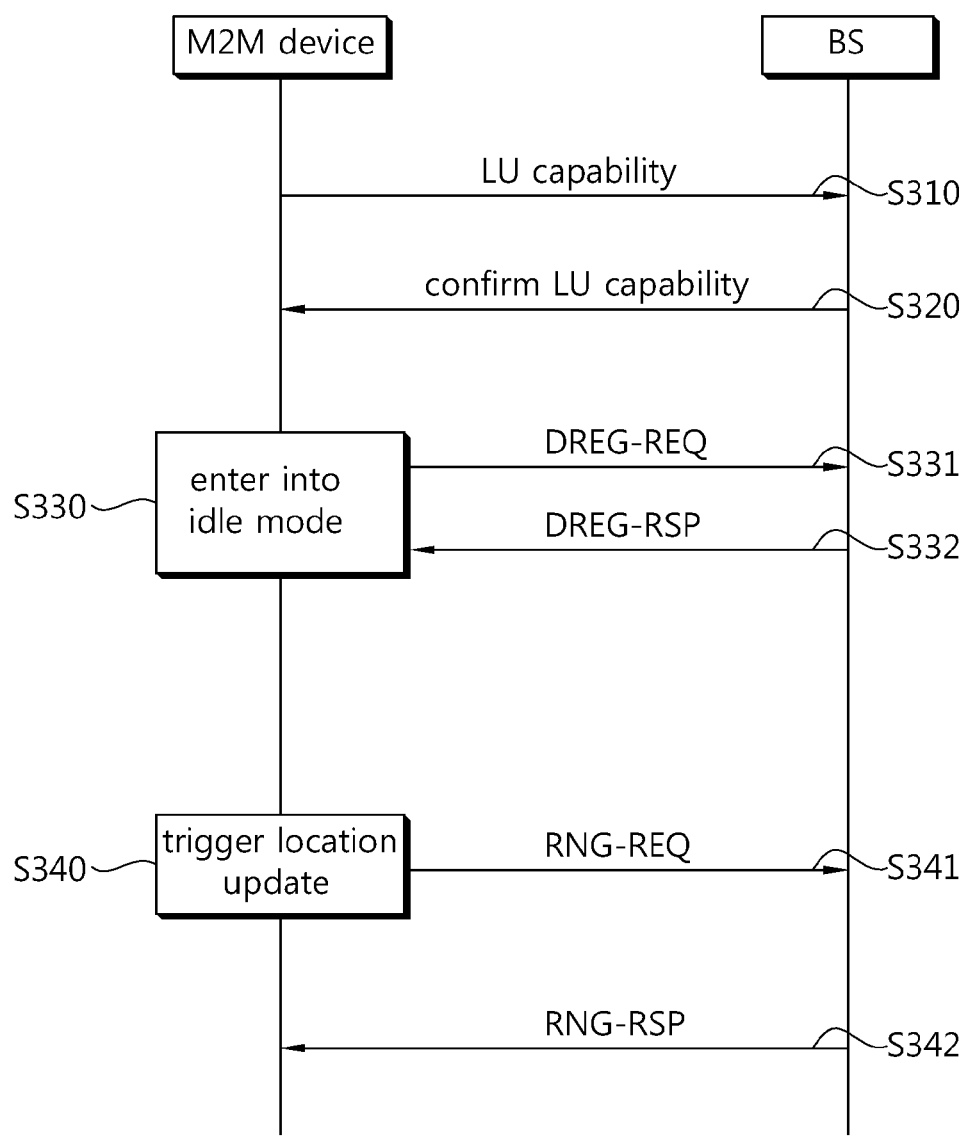
FIG. 3 is a flowchart illustrating a location update process according to an embodiment of the present invention.

FIG. 3 is a flowchart illustrating a location update process according to an embodiment of the present invention.

In step S310, the M2M device transmits a LU (Location Update) capability message to the base station. The LU capability message is used for the M2M device to inform the base station of at least one of the mobility type of the M2M device and M2M traffic type.

More specifically, an exemplary format of the LU capability message may be represented as follows. The name, number of bits, and values of the fields are merely examples.

TABLE 1

| Field name | Number of bits | Descriptions |
| --- | --- | --- |
| Mobility type | 2 | '00': no mobility<br>'01': slow (0~10 km/h)<br>'10': Medium<br>'11': Fast (above 120 km/h) |
| M2M traffic type | 2 | '00': Time Controlled Traffic<br>'01': Time Tolerant Traffic<br>'10': In-Frequent Traffic<br>'11': reserved |

'Time Controlled Traffic' is traffic having the time-controlled feature, 'Time Tolerant Traffic' is traffic having the time-tolerant feature, and 'In-Frequent Traffic' is irregular traffic.

In step S320, the M2M device receives a LU capability confirm message from the base station. The base station determines the LU type of the MTC device based on the LU capability of the M2M device. The LU capability confirm message includes the determined LU type.

An exemplary format of the LU capability confirm message may be represented as follows:

TABLE 2

| Field name | Number of bits | Descriptions |
| --- | --- | --- |
| LU type | 2 | '00': No Location Update<br>'01': Timer based LU<br>'10': Timer and Location based LU<br>'11': Location based LU |

'No Location Update' indicates that the M2M device does not perform LU.

'Timer based LU' indicates the periodic LU. The LU timer value may be included in the LU capability confirm message or a separate message and may be informed to the M2M device. The LU timer value may be given separately from the idle mode timer value for the existing periodic LU, and may be larger than the idle mode timer value. The M2M device, if the LU timer expires, performs LU. When LU is performed, the LU timer starts/restarts.

'Location based LU' indicates that LU is performed based on the location of the MTC device. However, in case the MTC device has low mobility or the MTC device has a small range of activity, the existing LU that is performed on a per-paging group basis may be meaningless. Accordingly, a LU area may be designated for 'Location based LU.'

For example, 'Location based LU type' may be defined as follows:

TABLE 3

| Filed name | Number of bits | Descriptions |
|---|---|---|
| Location based LU type | 1 | '0': per-cell LU<br>'1': per-paging group LU |

In accordance with the per-cell LU, as the MTC device shifts to another cell, LU is carried out. In the case of the per-paging group LU, as the MTC device shifts to another paging group, LU is performed.

The 'Location based LU type' may be included in the LU capability confirm message or in another message.

'Timer and Location based LU' indicates that the periodic LU and location-based LU both are performed.

Considering the mobility and traffic patterns of the M2M device, the LU type may be determined as follows:

No mobility: LU is unnecessary for time-controlled traffic. Non-time-controlled traffic performs periodic LU.

Low mobility: LU is unnecessary for time-controlled traffic. Non-time-controlled traffic performs periodic LU and/or location-based LU.

High mobility: LU is unnecessary for time-controlled traffic. Non-time-controlled traffic performs periodic LU and/or location-based LU.

The LU capability message and the LU capability confirm message may be exchanged when the MTC device makes entry or re-entry into the network. The LU capability message may be included in a SBC-REQ (Basic Capability Request) message, and the LU capability confirm message may be included in a SBC-RSP (Basic Capability Response) message. Or, the LU capability message may be included in a REG-REQ (Registration Request) message, and the LU capability confirm message may be included in a REG-RSP (Registration Response) message.

In step S330, the terminal enters into the idle mode (S330). For the entry into the idle mode, in step S331, the terminal sends a DREG-REQ message for requesting entry into the idle mode to the base station. In step S332, the terminal receives a DREG-RSP message indicating start of the idle mode from the base station.

The DREG-RSP message may include at least one of a paging cycle, paging offset, and FMDID.

Upon entry into the idle mode, a LU type may be set or changed. The LU capability message may be included in the DREG-REQ message, and the LU capability confirm message may be included in the DREG-RSP message.

In step S340, the M2M device determines whether the conditions for location update triggering are met in the idle mode.

In step S341, if the conditions for location update triggering are met, the mobile station sends a RNG-REQ (Ranging-Request) message indicating LU in the idle mode to the base station. The RNG-REQ message may include an indicator indicating LU in the idle mode and FMDID.

In step S342, the base station sends a RNG-RSP (Ranging-Response) message to the mobile station in response to the RNG-REQ.

Figure 4:
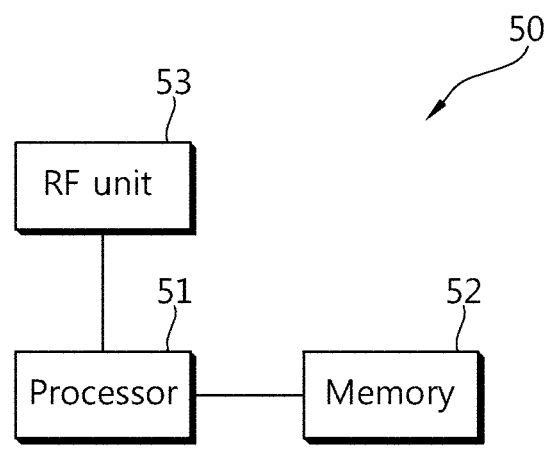
FIG. 4 is a block diagram illustrating a wireless device by which an embodiment of the present invention is implemented.

FIG. 4 is a block diagram illustrating a wireless device by which an embodiment of the present invention is implemented.

An MTC device 50 includes a processor 51, a memory 52, and a RF unit 53. The memory 52 is connected to the processor 51 and stores various types of information for driving the processor 51. The RF unit 53 is connected to the processor 51 and transmits and/or receives radio signals. The processor 51 implements the suggested functions, processes, and/or methods. In the embodiment illustrated in FIG. 3, the operation of the M2M device may be implemented by the processor 51.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing a location update for Machine To Machine (M2M) communication, the method comprising:

transmitting a location update capability message to a base station, the location update capability message including a mobility type of an M2M device and an M2M traffic type, wherein the mobility type of the M2M device indicates at least one of a fixed mobility, a low mobility, and a high mobility, and wherein the M2M traffic type indicates a time controlled traffic or a non-time controlled traffic;

receiving a location update capability confirm message from the base station, the location update capability confirm message including a location update type; and performing location update according to the location update type, wherein the location update type indicates periodic location update or a location-based update, wherein if the location update type indicates the location-based update, the location-based update is performed by a cell based update or a paging group based update, wherein if the mobility type indicates the low mobility and if the M2M traffic type indicates the non-time controlled traffic, the cell based update is used for the location-based update, wherein if the mobility type indicates the high mobility and if the M2M traffic type indicates the non-time controlled traffic, the paging group based update is used for the location-based update, and wherein an indicator is used to differentiate the cell based update and the paging group based update.

2. The method of claim 1, wherein the location update capability message and the location update capability confirm message are exchanged while a Machine Type Communication (MTC) device enters into a network or re-enters into the network.

3. The method of claim 1, wherein the location update is performed by a Machine Type Communication (MTC) device in an idle mode.

4. The method of claim 3, wherein performing the location update comprises:
   transmitting a range-request (RNG-REQ) message to the base station if a location update triggering condition depending on the location update type is met; and
   receiving a range-response (RNG-RSP) message from the base station in response to the RNG-REQ message.

5. The method of claim 4, wherein the location update capability message and the location update capability confirm message are a deregistration-request (DREG-REQ) message and a deregistration-response (DREG-RSP) message that are exchanged while in entry into the idle mode.

6. The method of claim 5, wherein the DREG-RSP message includes an identifier that identifies the MTC device while operating in the idle mode.

7. The method of claim 6, wherein the RNG-REQ message includes the identifier.

8. A wireless device configured for performing a location update for Machine To Machine (M2M) communication, the wireless device comprising:
   a radio frequency (RF) unit configured to transmit and receive a radio signal; and
   a processor operatively connected to the RF unit and configured to:
      transmit a location update capability message to a base station, the location update capability message including a mobility type of an M2M device and an M2M traffic type,
      wherein the mobility type of the M2M device indicates at least one of a fixed mobility, a low mobility, and a high mobility, and
      wherein the M2M traffic type indicates a time controlled traffic or a non-time controlled traffic;
      receive a location update capability confirm message from the base station, the location update capability confirm message including a location update type; and
      perform location update according to the location update type,
   wherein the location update type indicates periodic location update or a location-based update,
   wherein if the location update type indicates the location-based update, the location-based update is performed by a cell based update or a paging group based update,
   wherein if the mobility type indicates the low mobility and if the M2M traffic type indicates the non-time controlled traffic, the cell based update is used for the location-based update,
   wherein if the mobility type indicates the high mobility and if the M2M traffic type indicates the non-time controlled traffic, the paging group based update is used for the location-based update, and
   wherein an indicator is used to differentiate the cell based update and the paging group based update.

9. The wireless device of claim 8, wherein the location update capability message and the location update capability confirm message are exchanged while a Machine Type Communication (MTC) device enters into a network or re-enters into the network.

10. The wireless device of claim 8, wherein the location update is performed in an idle mode.

11. The wireless device of claim 10, wherein the processor is configured to performing the location update by:
   transmitting a range-request (RNG-REQ) message to the base station if a location update triggering condition depending on the location update type is met, and
   receiving a range-response (RNG-RSP) message from the base station in response to the RNG-REQ message.

* * * * *